United States Patent
Dominguez

(10) Patent No.: US 9,817,371 B2
(45) Date of Patent: Nov. 14, 2017

(54) SINGLE-EVENT TRANSIENT FEEDBACK DISTURBANCE SUPPRESSION SYSTEM

(71) Applicant: HONEYWELL INTERNATIONAL INC., Morristown, NJ (US)

(72) Inventor: Jose Dominguez, Glendale, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 481 days.

(21) Appl. No.: 14/521,258

(22) Filed: Oct. 22, 2014

(65) Prior Publication Data

US 2016/0116888 A1 Apr. 28, 2016

(51) Int. Cl.
 G05B 13/02 (2006.01)
 G05B 11/01 (2006.01)

(52) U.S. Cl.
 CPC .................. G05B 11/011 (2013.01)

(58) Field of Classification Search
 CPC .................................... G05B 11/011
 USPC .................. 700/33, 42, 46; 701/13
 See application file for complete search history.

(56) References Cited

U.S. PATENT DOCUMENTS

| | | | |
|---|---|---|---|
| 3,939,328 A | 2/1976 | Davis | |
| 4,872,104 A | 10/1989 | Holsinger | |
| 5,270,916 A * | 12/1993 | Sexton | G05B 5/01 700/41 |
| 5,614,801 A | 3/1997 | Miramonti | |
| 5,687,291 A * | 11/1997 | Smyth | G06N 3/049 600/544 |
| 5,867,384 A * | 2/1999 | Drees | G05B 5/01 700/42 |
| 6,424,873 B1 * | 7/2002 | Przybylski | G05B 5/01 318/610 |
| 6,917,862 B2 * | 7/2005 | Wie | G05D 1/0883 244/154 |
| 7,454,254 B2 | 11/2008 | McCoy | |
| 2007/0096754 A1 * | 5/2007 | Johnson | G01R 31/3181 324/754.19 |

* cited by examiner

Primary Examiner — Ziaul Karim
(74) Attorney, Agent, or Firm — Lorenz & Kopf, LLP

(57) ABSTRACT

A system for suppressing disturbances in a single-event transient susceptible (SET) signal includes an addition function, a subtraction function, an upper slew limiter, a lower slew limiter, and a magnitude limiter. The addition function adds the first offset to the SET susceptible signal to thereby generate an upper bound limit. The subtraction function subtracts the second offset from the SET susceptible signal to thereby generate a lower bound limit. The upper slew limiter limits the rate of change of the upper bound limit to thereby generate a rate limited upper bound limit. The lower slew limiter limits the rate of change of the lower bound limit to thereby generate a rate limited lower bound limit. The magnitude limiter prevents the magnitude of the SET susceptible signal from exceeding the magnitude of the rate limited upper bound limit and the magnitude of the rate limited lower bound limit.

20 Claims, 6 Drawing Sheets

SINGLE-EVENT TRANSIENT FEEDBACK DISTURBANCE SUPPRESSION SYSTEM

TECHNICAL HELD

The present invention generally relates to control systems, and more particularly relates to single-event transient (SET) feedback disturbance suppression system for feedback control systems.

BACKGROUND

Closed-loop feedback control systems are used to control various devices, systems, and processes. A typical closed-loop feedback control system includes a controller, a feedback path, and the controlled device, system, or process, sometimes referred to as the "plant." The controller receives a reference signal (or command), which is representative of a desired response of the plant, and a feedback signal, which is representative of the actual response of the plant. The controller determines the difference between the reference and feedback signals and supplies an error signal representative of the difference to the plant, to bring the actual response closer to the command.

Some closed-loop feedback control systems can be impacted by a single-event transient (SET). A SET is a momentary voltage pulse that is propagated through a circuit and appears as a voltage transient, an amplified version of the transient, or a flip in the logical output, of for example, an analog-to-digital converter (ADC). In some systems, the disturbance resulting from a SET can make the plant momentarily unstable, disrupting system operations.

Hence, there is a need for a system and method of suppressing the disturbance caused by a SET. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment a system for suppressing disturbances in a single-event transient susceptible (SET) signal includes an addition function, a subtraction function, an upper slew limiter, a lower slew limiter, and a magnitude limiter. The addition function is adapted to receive the SET susceptible signal and a first offset and is configured, upon receipt thereof, to add the first offset to the SET susceptible signal to thereby generate an upper bound limit. The subtraction function is adapted to receive the SET susceptible signal and a second offset and is configured, upon receipt thereof, to subtract the second offset from the SET susceptible signal to thereby generate a lower bound limit. The upper slew limiter is coupled to receive the upper bound limit and is configured, upon receipt thereof, to limit a rate of change of the upper bound limit to thereby generate a rate limited upper bound limit. The lower slew limiter is coupled to receive the lower bound limit and is configured, upon receipt thereof, to limit a rate of change of the lower bound limit to thereby generate a rate limited lower bound limit. The magnitude limiter is coupled to receive the rate limited upper bound limit, the rate limited lower bound limit, and the SET susceptible signal. Each of the rate limited upper bound limit, the rate limited lower bound limit, and the SET susceptible signal have a magnitude, and the magnitude limiter is configured, upon receipt of the rate limited upper bound limit, the rate limited lower bound limit, and the SET susceptible signal, to prevent the magnitude of the SET susceptible signal from exceeding the magnitude of the rate limited upper bound limit and the magnitude of the rate limited lower bound limit.

In another embodiment, a closed-loop feedback control system includes a control signal source and a single-event transient (SET) disturbance suppression system. The control signal source is configured to supply a control signal that is susceptible to a SET. The SET disturbance suppression system is coupled to receive the control, signal from the control signal source and is configured, upon receipt thereof, to suppress a disturbance caused by a SET. The SET disturbance suppression system includes an addition function, a subtraction function, an upper slew limiter, a lower slew limiter, and a magnitude limiter. The addition function is coupled to receive the control signal and a first offset, and is configured, upon receipt thereof, to add the first effect to the control signal to thereby generate an upper bound limit. The subtraction function is coupled to receive the control signal and a second offset and is configured, upon receipt thereof, to subtract the second offset from the control signal to thereby generate a lower bound limit. The upper slew limiter is coupled to receive the upper bound limit and is configured, upon receipt thereof, to limit a rate of change of the upper bound limit to thereby generate a rate limited upper bound limit. The lower slew limiter is coupled to receive the lower bound limit and is configured, upon receipt thereof, to limit a rate of change of the lower bound limit to thereby generate a rate limited lower bound limit. The magnitude limiter is coupled to receive the rate limited upper bound limit, the rate limited lower bound limit, and the control signal. Each of the rate limited upper bound limit, the rate limited lower bound limit, and the control signal have a magnitude, and the magnitude limiter is configured, upon receipt of the rate limited upper bound limit, the rate limited lower bound limit, and the control signal, to prevent the magnitude of the control signal from exceeding the magnitude of the rate limited upper bound limit and the magnitude of the rate limited lower bound limit.

In yet another embodiment, a closed-loop feedback control system for controlling a device includes an error circuit and a single-event transient (SET) disturbance suppression system. The error circuit is coupled to receive a device command and a feedback control signal representative of a response of the component. The error circuit is configured, upon receipt of the component command and the feedback control signal, to supply an error control signal representative of a difference between the device command and the feedback control signal. The SET disturbance suppression system is coupled to receive the error control signal and is configured, upon receipt thereof, to suppress a disturbance caused by a SET. The SET disturbance suppression system includes an addition function, a subtraction function, an upper slew limiter, a lower slew limiter, and a magnitude limiter. The addition function is coupled to receive the error control signal and a first offset and is configured, upon receipt thereof, to add the first offset to the error control signal to thereby generate art upper bound hunt. The subtraction function is coupled to receive the error control signal and a second offset and is configured, upon receipt thereof, to subtract the second offset from the error control signal to thereby generate a lower bound limit. The upper slew limiter is coupled to receive the upper bound limit and is configured, upon receipt thereof, to limit a rate of change of the upper bound limit to thereby generate a rate limited upper bound limit. The lower slew limiter is coupled to receive the lower bound limit and is configured, upon receipt thereof, to limit a rate of change of the lower bound limit to thereby generate a rate limited lower bound limit. The magnitude limiter is coupled to receive the rate limited upper bound limit, the rate limited lower bound limit, and the error control signal. Each of the rate limited upper bound limit, the rate limited lower bound limit, and the error control signal have a magnitude, and the magnitude limiter is configured, upon receipt of the rate limited upper bound limit, the rate limited lower bound limit, and the error control signal, to prevent the magnitude of the error control signal from exceeding the magnitude of the rate limited upper bound limit and the magnitude of the rate limited lower bound limit.

In still another embodiment, a closed-loop feedback control system for controlling a device includes an error circuit and a single-event transient (SET) disturbance suppression system. The error circuit is coupled to receive a device command and a feedback control signal representative of a response of the component. The error circuit is configured, upon receipt of the component command and the feedback control signal, to supply an error control signal representative of a difference between the device command and the feedback control signal. The SET disturbance suppression system is coupled to receive the feedback control signal and is configured, upon receipt thereof, to suppress a disturbance caused by a SET and supply the feedback control signal to the error circuit. The SET disturbance suppression system includes an addition function, a subtraction function, an upper slew limiter, a lower slew limiter, and a magnitude limiter. The addition function is coupled to receive the feedback control signal and a first offset and is configured, upon receipt thereof, to add the first offset to the feedback control signal to thereby generate an upper bound limit. The subtraction function is coupled to receive the feedback control signal and a second offset and is configured, upon receipt thereof, to subtract the second offset from the feedback control signal to thereby generate a lower bound limit. The upper slew limiter is coupled to receive the upper bound limit and is configured, upon receipt thereof, to limit a rate of change of the upper bound limit to thereby generate a rate limited upper bound limit. The lower slew limiter is coupled to receive the lower bound limit and is configured, upon receipt thereof, to limit a rate of change of the lower bound limit to thereby generate a rate limited lower bound limit. The magnitude limiter is coupled to receive the rate limited upper bound limit, the rate limited lower bound limit, and the feedback control signal. Each of the rate limited upper bound limit, the rate limited lower bound limit, and the feedback control signal have a magnitude, and the magnitude limiter is configured, upon receipt of the rate limited upper bound limit, the rate limited lower bound limit, and the feedback control signal, to prevent the magnitude of the control signal from exceeding the magnitude of the rate limited upper bound limit and the magnitude of the rate limited lower bound limit.

Furthermore, other desirable features and characteristics of the SET disturbance suppression system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
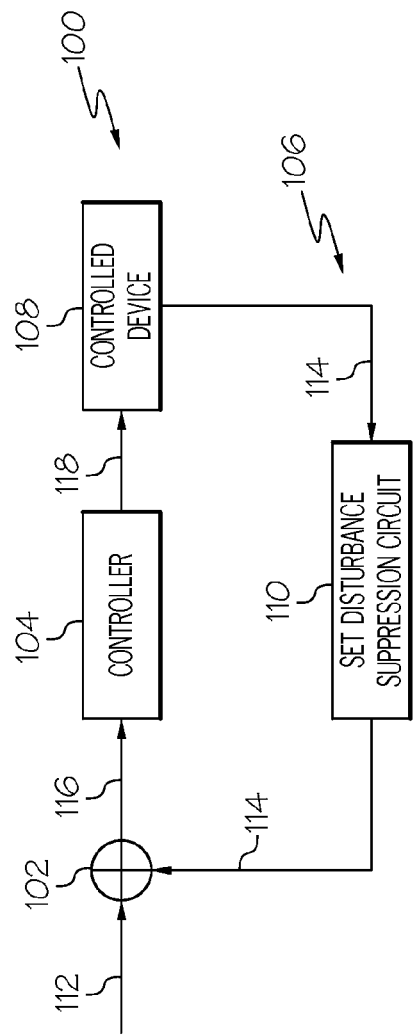
FIG. 1 depicts a functional block diagram of an example of one embodiment of a closed-loop feedback control system.

Referring first to FIG. 1, a functional block diagram of one embodiment of a closed-loop feedback control system 100 is depicted, and includes at least an error circuit 102, a controller 104, a feedback path 106, a controlled device 108, and a single-event transient (SET) disturbance suppression system 110. The error circuit 102 is coupled to receive a command signal 112 front a non-illustrated command source, and a feedback control signal 114 from the feedback, path 106. As is generally known, the command signal 112 is representative of a desired response of the controlled device 108, and may vary depending, for example, on the configuration and implementation of the controlled device 108. For example, in one embodiment the controlled device 108 is implemented using one or more control moment gyros (CMGs). In this embodiment, the command signal 112 is representative of a commanded CMG rate.

As is also generally known, the feedback control signal 114 is representative of the actual response of the controlled device 108, and may also vary depending, for example, on the configuration and implementation of the controlled device 108. For example, in the embodiment in which the controlled device 108 is implemented using one or more CMGs, the feedback control signal 114 is representative of the sensed CMG rate. In this regard, the feedback control signal 114 may be supplied from one or more suitable, non-illustrated sensors, such as one or more rate sensors.

Regardless of the specific sources of the command signal 112 and the feedback control signal 114, the error circuit 102 is configured, upon receipt of these signals 112, 114, to supply an error signal 116. The error signal 116, which is representative of the difference between the command signal 112 and the feedback control signal 114, is supplied to the controller 104. The controller 104, which may be implemented using any one of numerous suitable controls, is configured, upon receipt of the error signal 116 to supply a component control signal 118 to the controlled device 108 to bring the actual response toward the commanded response. It will be appreciated that, at least in some embodiments, the error circuit 102 may be implemented as part of the controller 104.

In the embodiment depicted in FIG. 1, the SET disturbance suppression system 110 is coupled in series in the feedback path 106, and thus receives the feedback control signal 114. The SET disturbance suppression system 110 is configured, upon receipt of the feedback control signal 114, to suppress disturbances in the feedback control signal 114 that may be caused by a SET, and supply the feedback control signal 114, via the feedback path 106, to the error circuit 102. Example embodiments of the SET disturbance suppression system 110 are depicted in FIGS. 3 and 4, and will momentarily be described.

Figure 2:
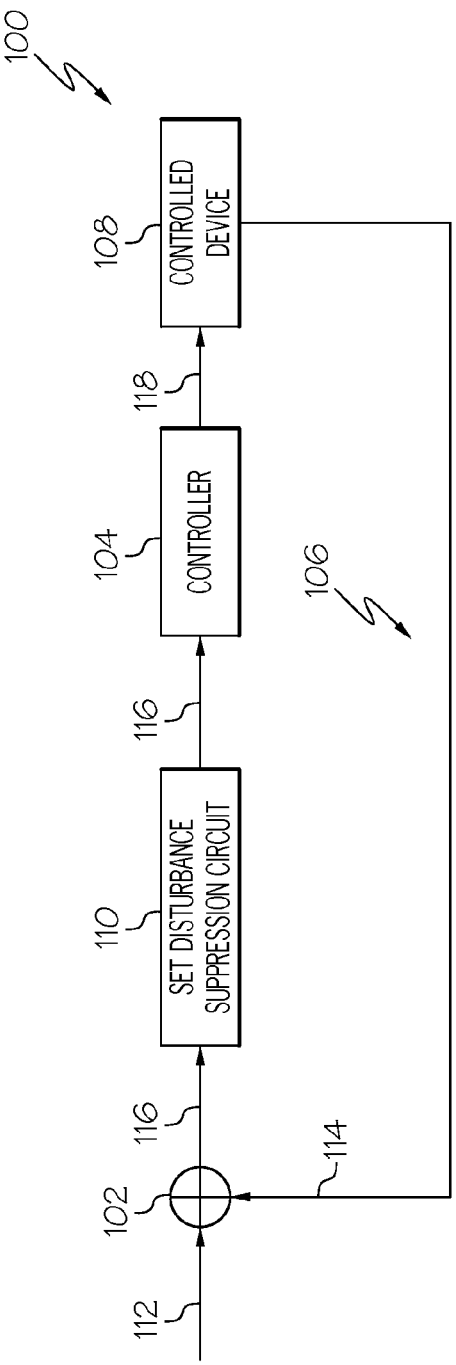
FIG. 2 depicts a functional block diagram of an example of another embodiment of a closed-loop feedback control system.

Before describing the SET disturbance suppression system 110, it is noted that in other embodiments, the SET disturbance suppression system 110 may instead (or also) be coupled in series between the error circuit 102 and the controller 104. One such embodiment is depicted in FIG. 2. In this embodiment, the SET disturbance suppression system 110 is coupled to receive the error signal 116. The SET disturbance suppression system 110 is configured, upon receipt of the error signal 116 to suppress disturbances in the error signal 116 that may be caused by a SET, and supply the error signal 116 to the controller 104.

Figure 3:
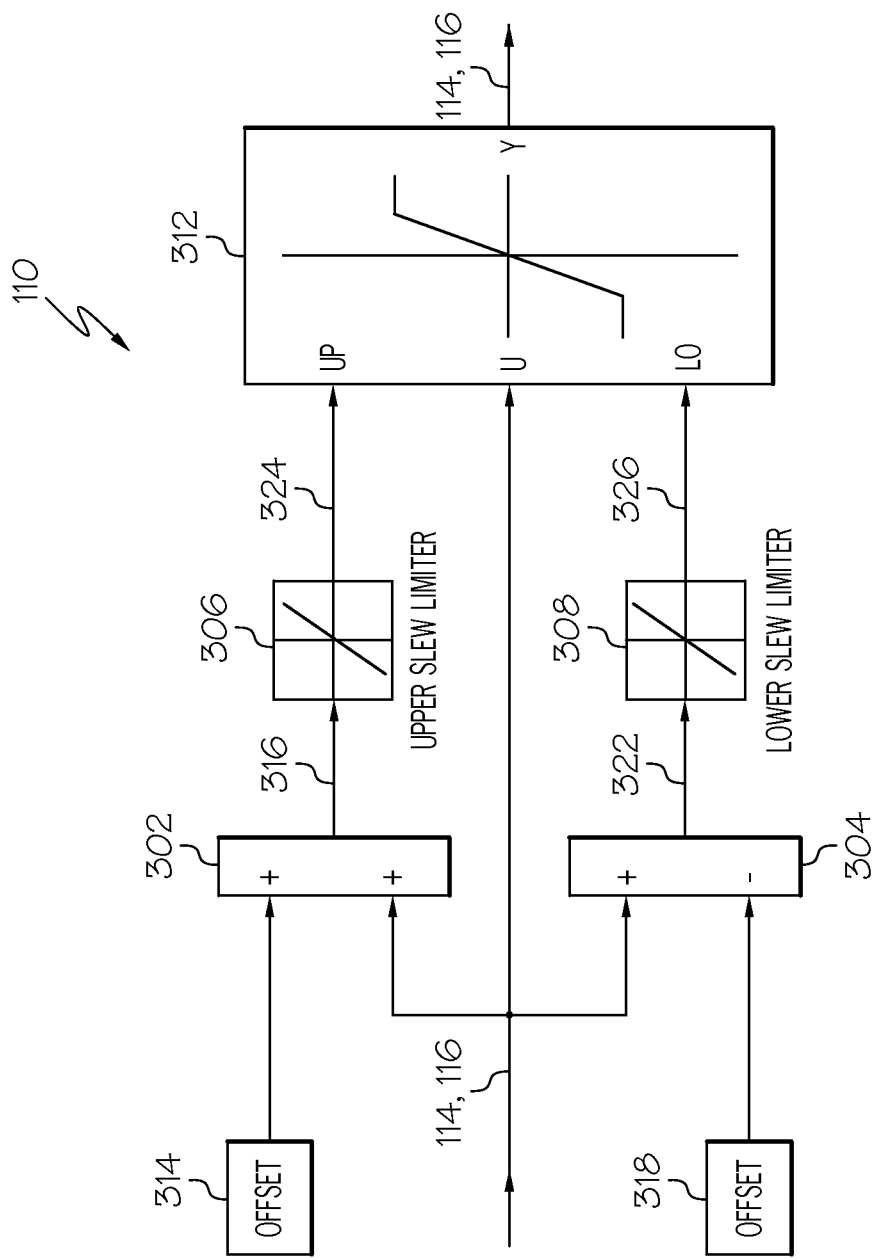
FIG. 3 depicts a functional block diagram of an example of one embodiment of a single-event transient (SET) suppression system that may be implemented in the closed-loop feedback control systems of FIGS. 1 and 2.
Figure 4:
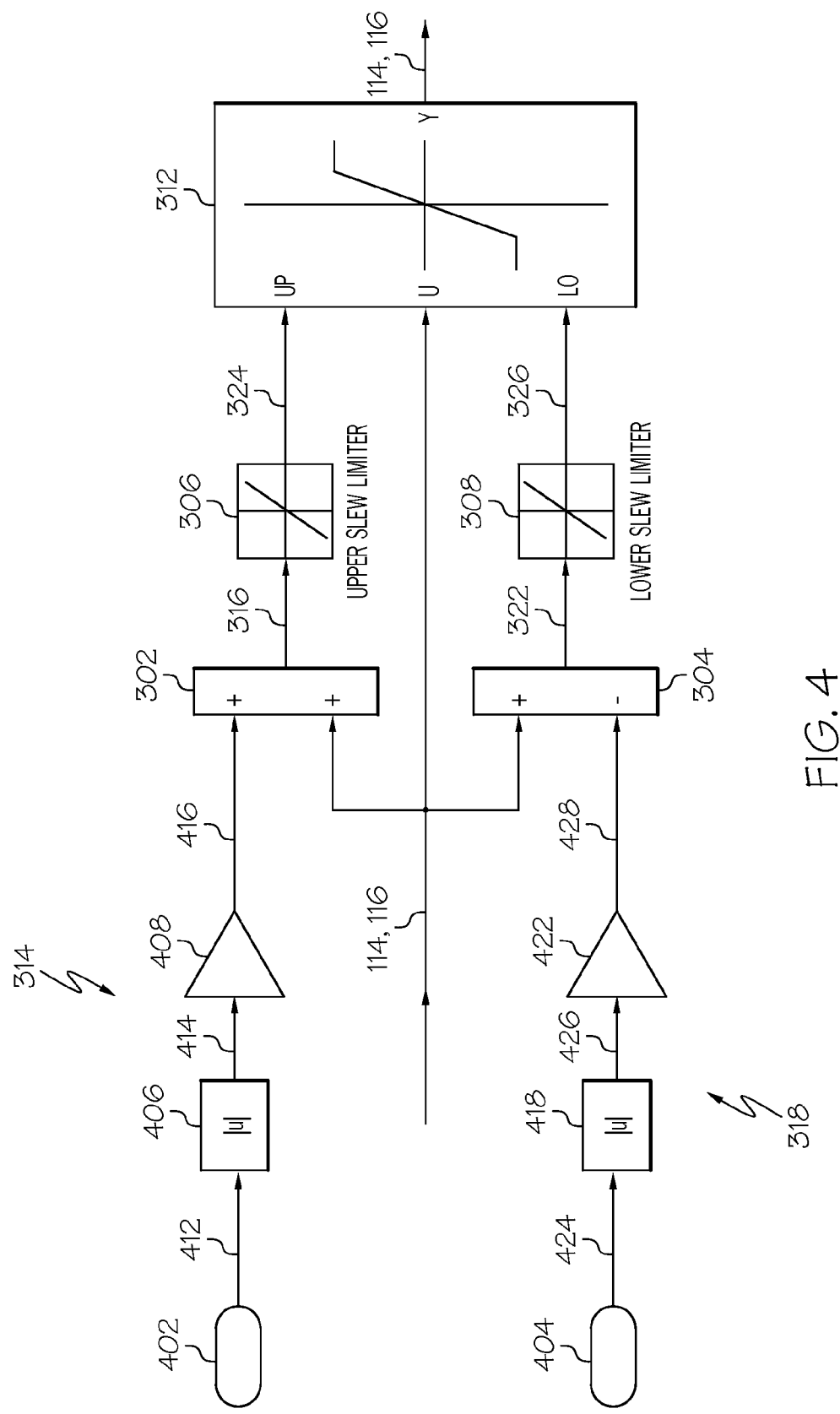
FIG. 4 depicts a functional block diagram of an example of another embodiment of a single-event transient (SET) suppression system that may be implemented in the closed-loop feedback control systems of FIGS. 1 and 2.

Turning now to FIGS. 3 and 4, it is seen that the depicted SET disturbance suppression system 110 includes an addition function 302, a subtraction function 304, an upper slew limiter 306, a lower slew limiter 308, and a magnitude limiter 312. The addition function 302 is coupled to receive the control signal (error or feedback) 114, 116 and a first offset 314. The addition function 302 is configured to add the first offset 314 to the control signal 114, 116 to thereby generate an upper bound limit 316. The subtraction function 304 is coupled to receive the control signal 114, 116 and a second offset 318. The subtraction function 304 is configured to subtract the second effect 318 from the control signal 114, 116 to thereby generate a lower bound limit 322.

Before proceeding further, it is noted that in the embodiment depicted in FIG. 3 the first and second offsets 314, 318 are fixed offset values. Specifically, the first offset 314 is a first predetermined fixed offset value and the second offset 318 is a second predetermined fixed offset value. However, in other embodiments, such as the one depicted in FIG. 4, the first and second offsets 314, 318 are both variable offset values. That is, the first offset 314 is a first variable offset value and the second offset 318 is a second variable offset value. With the embodiment depicted in FIG. 4, the first and second offsets 314, 318 are supplied from a first variable signal source 402 and a second variable signal source 404, respectively.

Although the first and second variable signal sources 402, 403 may be variously configured, in the depicted embodiment the first variable signal source 402 includes a first absolute value function 406 and a first amplifier 408. The first absolute value function 406 is coupled to receive a first variable signal 412 and is configured, upon receipt thereof, to supply a first signal 414 having a magnitude representative of the absolute value of the first variable signal 412. The first amplifier 408 is coupled to receive the first signal 414 and is configured, upon receipt thereof, to amplify the first signal 414 and supply an amplified first signal 416. Similarly, the second variable signal source 404 includes a second absolute value function 418 and a second amplifier 422. The second absolute value function 418 is coupled to receive a second variable signal 424 and is configured, upon receipt thereof, to supply a second signal 426 having a magnitude representative of the absolute value of the second variable signal 424. The second amplifier 422 is coupled to receive the second signal 426 and configured, upon receipt thereof, to amplify the second signal 426 and supply an amplified second signal 428. It will be appreciated that the first and second variable signals 412, 424 may be supplied from variable signal sources within the system 100 or may be independent variable signal sources.

Regardless of whether the first and second offsets 314, 318 are fixed or variable offset values, it is seen that the upper slew limiter 306 is coupled to receive the upper bound limit 316. The upper slew limiter 306 is configured, upon receipt of the upper bound limit 316, to limit the rate of change of the upper bound limit 316 to thereby generate a rate limited upper bound limit 324. The lower slew limiter 308 is coupled to receive the lower bound limit 322 and is configured, upon receipt thereof, to limit the rate of change of the lower bound limit 322 to thereby generate a rate limited lower bound limit 326. The rate limited upper bound limit 324 and the rate limited lower bound limit 326 are both supplied to the magnitude limiter 312.

The magnitude limiter 312 is coupled to receive the rate limited upper bound limit 324, the rate limited lower bound limit 326, and the feedback control signal 114. The magnitude limiter 312 is configured, upon receipt of the rate limited upper bound limit 324, the rate limited lower bound limit 326, and the feedback control signal 114, to prevent the magnitude of the feedback control signal 114 from exceeding the magnitude of the rate bruited upper bound limit 324 and the magnitude of the rate limited lower bound limit 326.

The SET disturbance suppression system 110 suppresses the effects of a SET on the performance of the controlled device 108 by controlling the magnitude of either the feedback control signal 114 or the error control signal 116. The magnitude limiter 312, which functions as a variable magnitude saturation limiter, provides a band that moves with the error or feedback. Moreover, the upper and lower slew limiters 306, 308 limit the time rate of change of the limits. Therefore, the error (or feedback) is magnitude limited and the limits of the limiter are rate of change limited. This combination produces no time lag in the response as opposed to using only a slew limiter on the error control signal 116.

Figure 5:
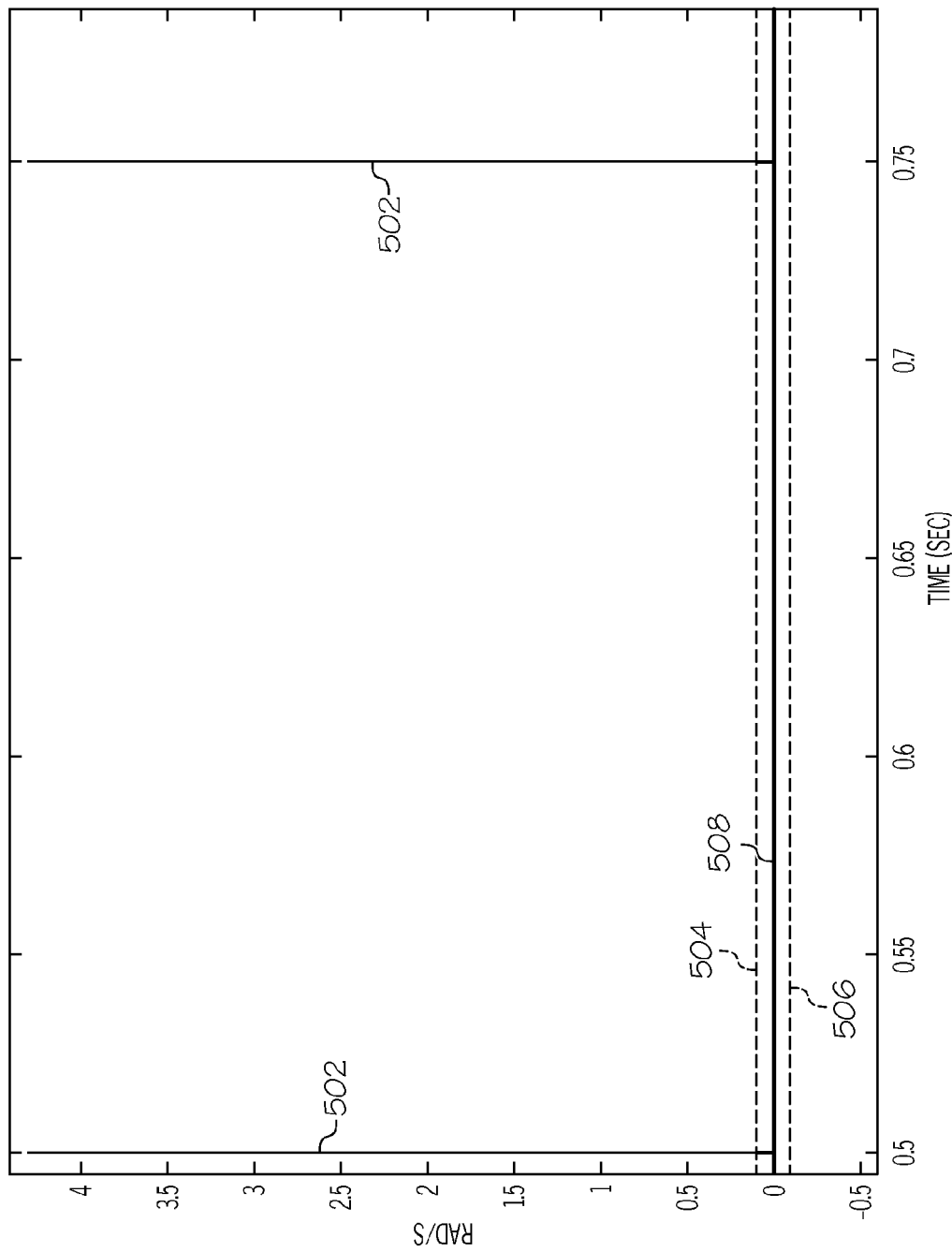
FIGS. 5 and 6 graphically depict an example response of the SET disturbance suppression system depicted in FIG. 3 to a simulated SET.
Figure 6:
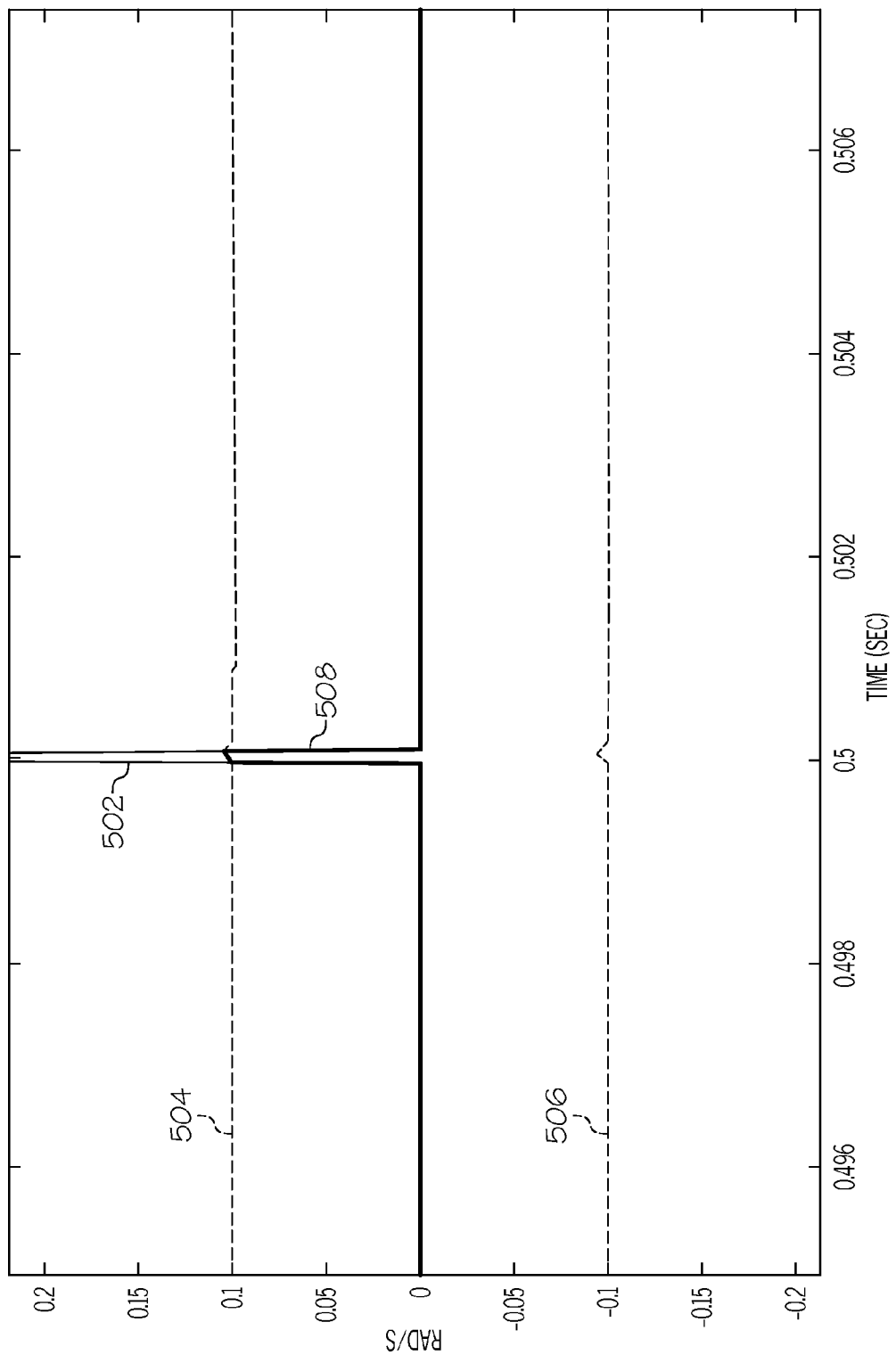

To more clearly illustrate operation of the SET disturbance suppression system 110, reference should now be made to FIGS. 5 and 6, which graphically depict the response of the SET disturbance suppression system 110 to a pair of simulated SETs. It is noted that FIG. 6 depicts only the first SET response, and does so on a much shorter time scale to more clearly illustrate the response. In both graphs, however, plot 502 represents the error signal 116 input to the SET disturbance suppression system 110, plots 504 and 506 represent the rate limited upper bound limit 324 and the rate limited lower bound limit 326, respectively, and plot 508 represents the error control signal 116 output by the SET disturbance suppression system 110. It should be noted that the depicted response is for a CMG control system that receives rate commands.

In the illustrated example, a SET occurs at about 0.5 seconds, and causes the error control signal 116 input to the SET disturbance suppression system 110 to reach a peak value of 4.3 rad/sec for a 1.8 rad/sec command. However, the SET disturbance suppression system 110 limits the error control signal 116 supplied to the downstream controls. In the depicted example, the first, and second offsets 314, 318 are fixed at 0.1 rad/sec, and the rising and falling slew rate limits on the upper and lower slew limiters 306, 308 limit the rate of change to ±50 rad/sec$^2$.

Figure 7:
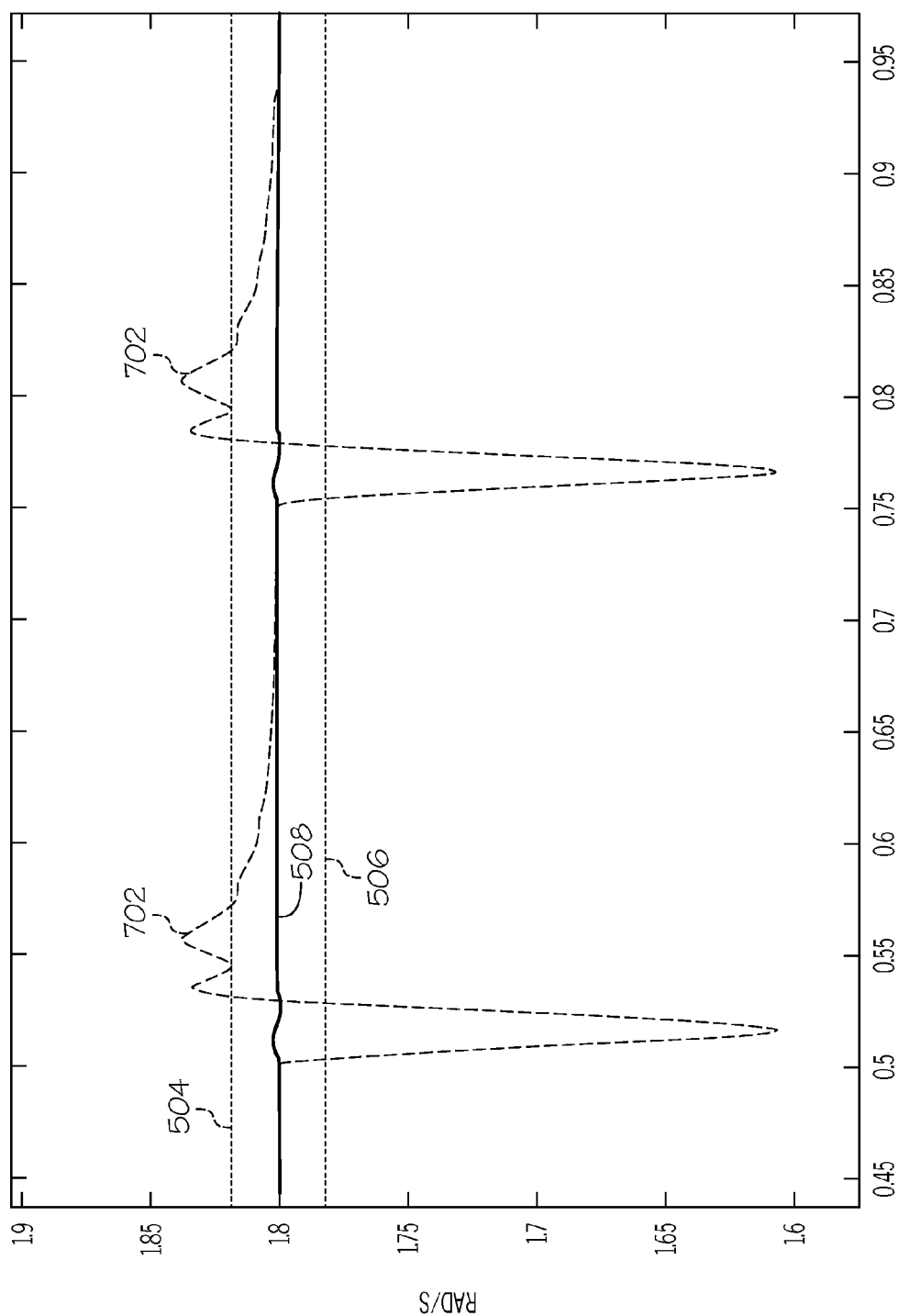
FIG. 7 graphically depicts a comparison of the example response to the simulated SET for a system that includes and does not include the SET disturbance suppression system.

For completeness, FIG. 7 is provided, which graphically depicts a comparison of the example response to the simulated SET for a system 100 that includes and does not include the SET disturbance suppression system 110. In FIG. 7, plot 508 depicts the response for a system 100 that includes the SET disturbance suppression system 110, and plot 702 depicts the response for a system 100 that does not include the SET disturbance suppression system 110.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entitles or actions. Numerical ordinals such as "first," "second," "third," etc. simply denote different singles of a plurality and do not imply any order or sequence unless specifically defined by the claim language. The sequence of the text in any or the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing front the scope of the invention as set forth in the appended claims.

What is claimed is:

1. A system for suppressing disturbances in a single-event transient susceptible (SET) signal, the system comprising:
    an addition circuit adapted to receive the SET susceptible signal and a first offset and configured, upon receipt thereof, to add the first offset to the SET susceptible signal to thereby generate an upper bound limit;
    a subtraction circuit adapted to receive the SET susceptible signal and a second offset and configured, upon receipt thereof, to subtract the second offset from the SET susceptible signal to thereby generate a lower bound limit;
    an upper slew limiter circuit coupled to receive the upper bound limit and configured, upon receipt thereof, to limit a rate of change of the upper bound limit to thereby generate a rate limited upper bound limit;
    a lower slew limiter circuit coupled to receive the lower bound limit and configured, upon receipt thereof, to limit a rate of change of the lower bound limit to thereby generate a rate limited lower bound limit; and
    a magnitude limiter circuit coupled to receive the rate limited upper bound limit, the rate limited lower bound limit, and the SET susceptible signal, each of the rate limited upper bound limit, the rate limited lower bound limit, and the SET susceptible signal having a magnitude, the magnitude limiter circuit configured, upon receipt of the rate limited upper bound limit, the rate limited lower bound limit, and the SET susceptible signal, to prevent the magnitude of the SET susceptible signal from exceeding the magnitude of the rate limited upper bound limit and the magnitude of the rate limited lower bound limit.

2. The system of claim 1, wherein:
    the first offset is a first predetermined fixed offset value; and the second offset is a second predetermined fixed offset value.

3. The system of claim 1, wherein:
the first offset is a first variable offset value; and
the second offset is a second variable offset value.

4. The system of claim 3, further comprising:
a first variable signal source configured to supply the first offset; and
a second signal source configured to supply the second offset.

5. The system of claim 4, wherein the first variable signal source comprises:
a first absolute value circuit coupled to receive a first variable signal and configured, upon receipt thereof, to supply a first signal having a magnitude representative of an absolute value of the first variable signal; and
a first amplifier circuit coupled to receive the first signal and configured, upon receipt thereof, to amplify the first signal and supply an amplified first signal.

6. The system of claim 5, wherein the second variable signal source comprises:
a second absolute value circuit coupled to receive a second variable signal and configured, upon receipt thereof, to supply a second signal having a magnitude representative of an absolute value of the second variable signal; and
a second amplifier circuit coupled to receive the second signal and configured, upon receipt thereof, to amplify the second signal and supply an amplified second signal.

7. A closed-loop feedback control system, comprising:
a control signal source configured to supply a control signal, the control signal susceptible to a single-event transient (SET); and
a SET disturbance suppression system coupled to receive the control signal from the control signal source and configured, upon receipt thereof, to suppress a disturbance caused by a SET, the SET disturbance suppression system comprising:
an addition circuit coupled to receive the control signal and a first offset and configured, upon receipt thereof, to add the first offset to the control signal to thereby generate an upper bound limit;
a subtraction circuit coupled to receive the control signal and a second offset and configured, upon receipt thereof, to subtract the second offset from the control signal to thereby generate a lower bound limit;
an upper slew limiter circuit coupled to receive the upper bound limit and configured, upon receipt thereof, to limit a rate of change of the upper bound limit to thereby generate a rate limited upper bound limit;
a lower slew limiter circuit coupled to receive the lower bound limit and configured, upon receipt thereof, to limit a rate of change of the lower bound limit to thereby generate a rate limited lower bound limit; and
a magnitude limiter circuit coupled to receive the rate limited upper bound limit, the rate limited lower bound limit, and the control signal, each of the rate limited upper bound limit, the rate limited lower bound limit, and the control signal having a magnitude, the magnitude limiter circuit configured, upon receipt of the rate limited upper bound limit, the rate limited lower bound limit, and the control signal, to prevent the magnitude of the control signal from exceeding the magnitude of the rate limited upper bound limit and the magnitude of the rate limited lower bound limit.

8. The system of claim 7, wherein:
the first offset is a first predetermined fixed offset value; and
the second offset is a second predetermined fixed offset value.

9. The system of claim 7, wherein:
the first offset is a first variable offset value; and
the second offset is a second variable offset value.

10. The system of claim 9, further comprising:
a first variable signal source configured to supply the first offset; and
a second signal source configured to supply the second offset.

11. The system of claim 10, wherein the first variable signal source comprises:
a first absolute value circuit coupled to receive the first variable signal and configured, upon receipt thereof, to supply a first signal having a magnitude representative of an absolute value of the first variable signal; and
a first amplifier circuit coupled to receive the first signal and configured, upon receipt thereof, to amplify the first signal and supply an amplified first signal.

12. The system of claim 11, wherein the second variable signal source comprises:
a second absolute value circuit coupled to receive the second variable signal and configured, upon receipt thereof, to supply a second signal having a magnitude representative of an absolute value of the second variable signal; and
a second amplifier circuit coupled to receive the second signal and configured, upon receipt thereof, to amplify the second signal and supply an amplified second signal.

13. The system of claim 7, wherein:
the closed-loop feedback control system includes a feedback signal path that supplies a feedback control signal; and
the control signal is the feedback control signal.

14. The system of claim 7, wherein:
the closed-loop feedback control system includes an error signal path that supplies an error control signal; and
the control signal is the error control signal.

15. A closed-loop feedback control system for controlling a device, comprising:
an error circuit coupled to receive a device command and a feedback control signal representative of a response of the component, the error circuit configured, upon receipt of the component command and the feedback control signal, to supply an error control signal representative of a difference between the device command and the feedback control signal; and
a single-event transient (SET) disturbance suppression system coupled to receive the error control signal and configured, upon receipt thereof, to suppress a disturbance caused by a SET, the SET disturbance suppression system comprising:
an addition circuit coupled to receive the error control signal and a first offset and configured, upon receipt thereof, to add the first offset to the error control signal to thereby generate an upper bound limit;
a subtraction circuit coupled to receive the error control signal and a second offset and configured, upon receipt thereof, to subtract the second offset from the error control signal to thereby generate a lower bound limit;

an upper slew limiter circuit coupled to receive the upper bound limit and configured, upon receipt thereof, to limit a rate of change of the upper bound limit to thereby generate a rate limited upper bound limit;

a lower slew limiter circuit coupled to receive the lower bound limit and configured, upon receipt thereof, to limit a rate of change of the lower bound limit to thereby generate a rate limited lower bound limit; and a magnitude limiter circuit coupled to receive the rate limited upper bound limit, the rate limited lower bound limit, and the error control signal, each of the rate limited upper bound limit, the rate limited lower bound limit, and the error control signal having a magnitude, the magnitude limiter circuit configured, upon receipt of the rate limited upper bound limit, the rate limited lower bound limit, and the error control signal, to prevent the magnitude of the error control signal from exceeding the magnitude of the rate limited upper bound limit and the magnitude of the rate limited lower bound limit.

16. The system of claim 15, wherein:
the first offset is a first predetermined fixed offset value; and
the second offset is a second predetermined fixed offset value.

17. The system of claim 15, wherein:
the first offset is a first variable offset value; and
the second offset is a second variable offset value.

18. A closed-loop feedback control system for controlling a device, comprising:
an error circuit coupled to receive a device command and a feedback control signal representative of a response of the device, the error circuit configured, upon receipt of the device command and the feedback control signal, to supply an error control signal representative of a difference between the device command and the feedback control signal; and a single-event transient (SET) disturbance suppression system coupled to receive the feedback control signal and configured, upon receipt thereof, to suppress a disturbance caused by a SET and supply the feedback control signal to the error circuit, the SET disturbance suppression system comprising:

an addition circuit coupled to receive the feedback control signal and a first offset and configured, upon receipt thereof, to add the first offset to the feedback control signal to thereby generate an upper bound limit;

a subtraction circuit coupled to receive the feedback control signal and a second offset and configured, upon receipt thereof, to subtract the second offset from the feedback control signal to thereby generate a lower bound limit;

an upper slew limiter circuit coupled to receive the upper bound limit and configured, upon receipt thereof, to limit a rate of change of the upper bound limit to thereby generate a rate limited upper bound limit;

a lower slew limiter circuit coupled to receive the lower bound limit and configured, upon receipt thereof, to limit a rate of change of the lower bound limit to thereby generate a rate limited lower bound limit; and a magnitude limiter circuit coupled to receive the rate limited upper bound limit, the rate limited lower bound limit, and the feedback control signal, each of the rate limited upper bound limit, the rate limited lower bound limit, and the feedback control signal having a magnitude, the magnitude limiter circuit configured, upon receipt of the rate limited upper bound limit, the rate limited lower bound limit, and the feedback control signal, to prevent the magnitude of the feedback control signal from exceeding the magnitude of the rate limited upper bound limit and the magnitude of the rate limited lower bound limit.

19. The system of claim 18, wherein:
the first offset is a first predetermined fixed offset value; and
the second offset is a second predetermined fixed offset value.

20. The system of claim 18, wherein:
the first offset is a first variable offset value; and
the second offset is a second variable offset value.

* * * * *